March 31, 1959 M. M. ARMSTRONG 2,880,340

COLOR TELEVISION RECEIVER

Filed Jan. 31, 1955

INVENTOR.
Merlyn M. Armstrong,
BY
Mueller & Aichele
Attys.

United States Patent Office 2,880,340

Patented Mar. 31, 1959

2,880,340

COLOR TELEVISION RECEIVER

Merlyn M. Armstrong, Oak Park, Ill., assignor to Motorola, Inc., Chicago, Ill., a corporation of Illinois Application January 31, 1955, Serial No. 485,160

3 Claims. (Cl. 313—77)

This invention relates to color television receivers and, more particularly, to a system for controlling the convergence of electron beams in a tri-beam cathode ray tube used in such receivers for reproducing colored images.

Many present day color television receivers utilize cathode ray reproducing tubes wherein a plurality of beams are generated by spaced sources at one end of the tube and are directed at, and scanned across, a viewing screen at the other end of the tube to reproduce distinct colored images thereon which appear to the eye as an integrated color picture. In such reproducing tubes it is necessary to converge the different beams which originate from the spaced sources so that they are in proper registry to produce the distinct color images. One such color tube employs a multi-colored sensitive surface having a plurality of separate phosphor dots, each of which emits light of a different primary color when impinged by an electron beam. These phosphor dots are closely arranged in triad groups, and each group is aligned with the corresponding opening of an apertured disc known as a shadow mask which is supported between the group of dots and the electron beam sources. The plurality of electron beams each modulated with the color information for a particular set of phosphor dots is scanned across the mask so that the individual beams strike the corresponding phosphor dots. Each group of dots then comprises an element of the completed color picture.

It is common to employ three electron beams emanating from separated sources within the cathode ray tube, with all of such beams being deflected by a common horizontal and vertical deflection system in order to scan the shadow mask. It is then necessary that the three beams be converged at each opening of the shadow mask in order that they may pass therethrough to impinge upon the proper phosphor dots, and that such convergence be maintained throughout each scanning cycle of the beams. However, since the electron beams are scanned through rather wide angles and across a shadow mask all parts of which are not equidistant from the sources of the beams, the amount of convergence applied to the beams must be varied during the scanning of the beams across the shadow mask. That is, a dynamic convergence control must be used. Furthermore, it has been found necessary in the present day color television receivers to provide a fixed field which may be regulated to converge the three beams in a given position of the shadow mask, and to which the field produced by the dynamic convergence control may be added or subtracted to produce the desired convergence in all parts of the shadow mask.

It is, accordingly, an object of the present invention to provide inexpensive and simply constructed apparatus for converging the electron beams in a tri-beam cathode ray tube as used in a color television receiver.

A further object of the invention is to provide an improved and easily adjustable source of a fixed or static field to be used in conjunction with a dynamically varying field for converging the electron beams in the cathode ray tube of a color television receiver.

A feature of the invention is the provision of improved convergence apparatus including a plurality of permanent magnets supported in movable relation with respect to an equal number of dynamic convergence coils in a color television receiver to provide fixed or static magnetic fields for converging the electron beams in a tri-beam cathode ray tube.

Another feature is the provision of improved beam convergence apparatus for a tri-beam cathode ray tube including a support arm slidably supported by a bracket, and a permanent magnet affixed to an end of such an arm which end is movable toward and away from the core of a dynamic convergence coil used in converging one electron beam with respect to the others in the tri-beam cathode ray tube.

Another feature of the invention is the provision of such improved beam converging apparatus including a plurality of dynamic convergence coils having core portions, and bracket members supported adjacent each of such coils with slidable arms supported thereby on which arms are disposed respective permanent magnets with poles in alignment with the respective core portions of the associated coils; and in which each slidable arm has a restricted section adjacent the permanent magnet supported thereby so that the arm may conveniently be turned 180° on its longitudinal axis while such restricted section is engaged by the support bracket in order to reverse the permanent magnet supported thereby so as to achieve the necessary polarity for proper convergence control.

Further objects, features and the attending advantages thereof will be apparent upon consideration of the following description when taken in conjunction with the accompanying drawings in which.

Figures 1, 2, 3:
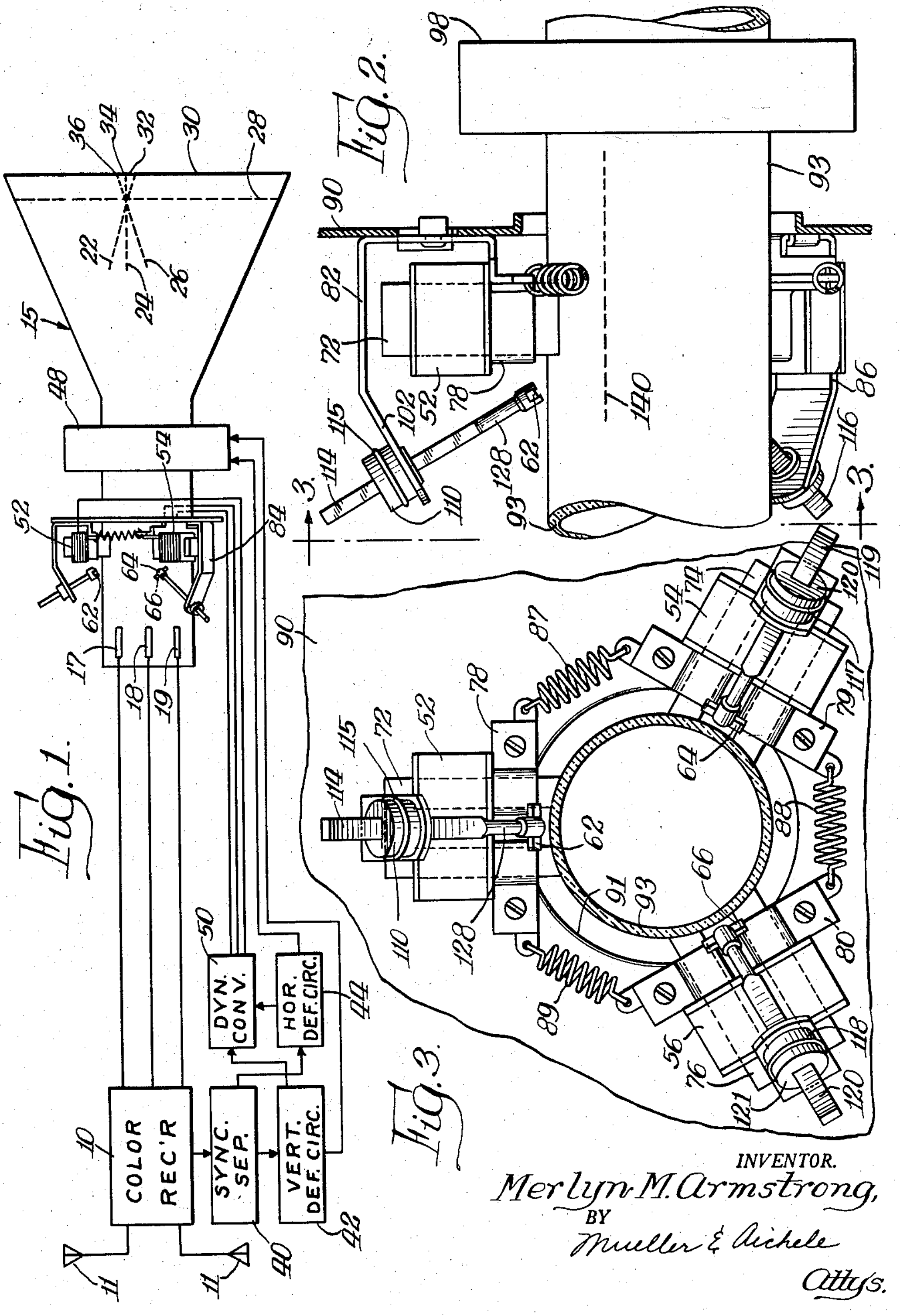
Fig. 1 is a block diagram of a color television receiver utilizing the present invention.
Fig. 2 is an enlarged view of a portion of the convergence yoke of the present invention.
Fig. 3 is a view taken along the line 3—3 of Fig. 2.

According to the invention, there is provided a system for converging the three beams of a tri-beam cathode ray tube as used in a color television receiver. Three sets of dynamic convergence coils are supported on cores having end portions adapted to be disposed on the neck of the cathode ray tube and spaced so that the end portions of each core are adjacent the path of a beam. Such coils may be energized to furnish dynamic convergence of the beams. In order to converge the beams in a given position of the beam target, each core has an associated permanent magnet for producing a fixed magnetic field. The magnets, however, are mounted on respective slidable arms and may be positioned at a selected distance from the associated core so that the amount of fixed field influencing each beam may be varied. The arms are supported by brackets so that the magnets are in alignment with the core portions but each support arm has a section of reduced cross-sectional area which permits rotation of the arm within the bracket when the arm is withdrawn so that the section is supported by the bracket. Thus, it is possible to turn the permanent magnet by 180° to reverse the alignment of the core portions and the permanent magnet. Therefore, the fields produced by the dynamic convergence coils and the associated cores may be combined with fixed fields which either aid or oppose the dynamically varying fields in order to converge the electron beams in all their respective positions.

Referring now to the drawing, Fig. 1 shows a color television receiver in diagrammatic form. The receiver 10 is coupled to antenna 11 which provides signals for the multi-beam cathode ray image reproducing tube 15. Color signals corresponding to three primary colors are applied to the electron guns 17, 18 and 19 which produce electron beams 22, 24 and 26, only partially shown, and illustrated greatly out of proportion for clarity. An apertured shadow mask 28 is disposed near the cathode ray tube screen 30 and in the plane of this mask the beams 22, 24 and 26 are converged to pass through the apertures therein in order to impinge upon triad groups of phosphor dots such as 32, 34 and 36.

Also coupled to the television receiver apparatus 10 is a synchronizing signal separator 40 which, together with a vertical scanning circuit 42 and a horizontal scanning circuit 44, comprise the sweep system of the receiver. The circuits 42 and 44 are each coupled to the deflection yoke 48, which is disposed on the neck of the cathode ray tube 15 so that deflection signals applied to this yoke produce suitable scanning of the electron beams in the vertical and horizontal directions across the shadow mask 28 and screen 30. It may be seen that as the electron beams are scanned across the shadow mask, the edges of the shadow mask will be at different distances from the electron guns 17–19 than will the center sections of the mask so that the point of convergence of focus of the beams must vary continually during the various scanning cycles. Accordingly, a dynamic convergence control circuit 50 of any known construction is coupled to the horizontal and vertical deflection circuits 44 and 42 in order to develop proper convergence signals which are synchronized with the sweep system and applied to the dynamic convergence coils 52, 54, and 56 of the image reproducer 15.

Convergence of the beams in a given position of the shadow mask 28 may be initially effected by proper adjustment of the small permanent magnets 62, 64 and 66. To the fixed or static fields of these magnets the fields produced by the dynamic convergence coils 52, 54 and 56 are added in order to effect convergence at all positions of the shadow mask. In accordance with this invention, it has been found that the absolute value of the convergence effect utilized to influence each of the three beams may be simply produced by the positioning of the permanent magnets 62, 64 and 66, and that it is then only necessary to add the dynamically varying field to this fixed field in order to converge the beams properly in all positions of the shadow mask. Therefore, the dynamic convergence circuit 50 need only provide a parabolic current wave form for each of the dynamic convergence coils 52, 54 and 56 while adjustment of the absolute value of the fields produced by such signals may be provided by the permanent magnets.

Figs. 2 and 3 illustrate additional views of the convergence yoke of this invention. It may be seen that the three dynamic convergence coils, 52, 54 and 56 are wound respectively on U-shaped magnetic cores 72, 74, and 76. These three cores are clamped by means of brackets 78, 79 and 80 respectively to brackets 82, 84 and 86. Brackets 82, 84 and 86 are disposed in equally spaced radial relationship on the supporting plate 90 which has a central aperture 91 so that the entire structure may be positioned on neck 93 of tube 15. Brackets 82, 84 and 86 are slidably mounted on plate 90 with springs 87–89 tightening the apparatus around neck 93. The windings 52, 54 and 56 and their associated magnetic cores 72, 74 and 76 are located so that the open ends of these U-shaped cores are each disposed adjacent the path of an electron beam from one of the guns 17–19.

As shown in Fig. 2, the bracket 82 is extended perpendicular to the plate 90 beyond the coil 52 and has an end portion 102 which is bent back toward the convergence coil 52. Brackets 84 and 86 are similarly constructed. A small support member 110 is secured to the end portion 102 and this support member has a rectangular aperture therethrough in which an arm member 114 of corresponding rectangular section is slidably supported. A resilient clip 115 may be utilized in the rectangular aperture of the support member 110 in order to retain the arm 114 in a given longitudinal position. However, the firmness of retention of the arm by clip 115 is not so great as to preclude slidable adjustment of the arm and movement of the end thereof toward and away from the core 72. Respective support members 120 and 121 are disposed respectively on end portions of brackets 84 and 86 which together with resilient clips 117 and 118 support arm members 119 and 120.

Permanent magnet 62 is secured to one end of the arm 114 and this magnet has the poles thereof aligned with the end portions of the U-shaped core 72 (Fig. 3). There is a rounded, restricted section 128 at the end of arm 114 adjacent permanent magnet 62 so that if the arm is positioned with section 128 within the aperture of support member 110 the arm may be rotated freely thereby permitting reversal of the magnet by 180°. The construction of arm members 119 and 120 is similar to that of 114 and it is to these arms to which magnets 64 and 66 are attached in alignment with end portions of cores 74 and 76.

It is apparent that by slidable movement of the arm 114, magnet 62 may be positioned so that its field has a greater or lesser effect upon the cathode ray beam passing along a path such as path 140 (Fig. 2). Therefore, the fixed magnetic field may be combined with the magnetic field produced by energization of the coil 52 in order to produce convergence of a given electron beam with respect to the other beams. In practice, the usual procedure is to converge the electron beams 22, 24 and 26 in a static or non-deflected position by adjustment of the permanent magnets 62, 64 and 66 so that the effect of the fields of these magnets when combined with the effect of the dynamically varying field produced by the convergence coils and their respective cores will result in the desired static convergence. That is, there will be inter-action between the fixed field of the permanent magnets and the dynamically varying fields of the convergence coils, but the fixed field from the permanent magnets may be adjusted so that the combination of the two fields produces the desired convergence in a fixed or static position of the beams. After this has been accomplished, it may then be necessary to vary the amplitude of the dynamic convergence signal from the circuit 50 as applied to each of the convergence coils 52, 54 and 56 so that the respective beams will be converged along all of their scanned positions. If in so changing the amplitude of the dynamically varying signals the absolute value of the fields at the previously adjusted static position of the beams has been changed it would then be necessary to make slight readjustments of the positions of the permanent magnets. However, by suitable positioning of these magnets and the application of a signal of suitable amplitude to the dynamic convergence coils it is possible to converge the electron beams along virtually all of their scanned positions of the shadow mask.

It should be pointed out that the convergence system of the present invention provides simple and convenient adjustment of the static convergence of the beams which is of a fixed quantity and would not be subject to appreciable change by variation in line voltage or aging of components. The greater reliability and stability provided is a distinct advantage of the invention. Furthermore, the structure is of inexpensive construction and does provide convenient adjustment of the static convergence by the mere positioning of the arm members. A considerable influence upon each beam is possible by sliding the arm members toward and away from the field produced by the convergence coils and the effect so produced may be provided in additive or subtracting relation with the dynamically varying field by the mere twisting of the arm members about their restricted sections as previously described. The invention provides, therefore, a highly satisfactory beam convergence system for use with tri-beam cathode ray tubes as utilized in color television receivers.

I claim:

1. Apparatus for positioning a beam in a tri-beam cathode ray tube, including in combination, inductor means having a winding adapted to be energized by beam control signals and a U-shaped core having an open side with two end portions at the open side disposed near the path of the beam, frame means, said frame means having an aperture of given cross section therein, an elongated rod member having a given cross section, the cross section of said aperture and the cross section of said rod member having corresponding shapes to support said rod member in said aperture in a limited number of rotational positions about the longitudinal axis of said rod member whereby said rod member engages the sides of said aperture to prevent rotation thereof and to maintain constant the longitudinal axis of said rod member with respect to said frame means, a permanent magnet supported on one end of said rod member and having poles with the poles thereof aligned with respective ones of the end portions of said U-shaped core and with the alignment thereof being reversible upon repositioning of said rod member in said aperture of said frame means, and said rod member being maintained in said frame means in an established axial position upon adjustment thereof to such position.

2. Apparatus for positioning a beam in a tri-beam cathode ray tube, including in combination, inductor means having a winding adapted to be energized by beam control signals and a U-shaped core having an open side with two end portions at the open side disposed near the path of the beam, frame means, said frame means having an aperture of rectangular cross section therein, an elongated rod member having a rectangular cross section, the cross section of said aperture and the cross section of said rod member corresponding in shape to support said rod member in said aperture in two rotational positions differing by 180° about the longitudinal axis of said rod member whereby said rod member engages the sides of said aperture to prevent rotation thereof and to maintain constant the longitudinal axis of said rod member with respect to said frame means, a permanent magnet supported on one end of said rod member and having poles with the poles thereof aligned with respective ones of the end portions of said U-shaped core and with the alignment thereof being reversible upon repositioning of said rod member in said aperture of said frame means, and said rod member being maintained in said frame means in an established axial position upon adjustment thereof to such position.

3. Apparatus for positioning a beam in a tri-beam cathode ray tube, including in combination, inductor means having a winding adapted to be energized by beam control signals and a U-shaped core having an open side with two end portions at the open side disposed near the path of the beam, frame means, said frame means having an aperture of given cross section therein, an elongated rod member having a given cross section, the cross section of said aperture and the cross section of said rod member having corresponding shapes to support said rod member in said aperture in two rotational positions differing by 180° about the longitudinal axis of said rod member whereby said rod member engages the sides of said aperture to prevent rotation thereof and to maintain constant the longitudinal axis of said rod member with respect to said frame means, a permanent magnet supported on one end of said rod member, and having poles with the poles thereof aligned with respective ones of the end portions of said U-shaped core and with the alignment thereof being reversible upon repositioning of said rod member in said aperture of said frame means, means on said frame means frictionally engaging said rod member for maintaining the same in a given axial position, and said rod member having a portion of reduced cross-sectional area substantially adjacent said one end thereof to permit repositioning of said rod member with such portion of reduced cross-sectional area disposed in said aperture of said frame means for reversing the polarity of said magnet with respect to said end portions of said U-shaped core.

References Cited in the file of this patent

UNITED STATES PATENTS

| | | |
|---|---|---|
| 2,157,182 | Maloff | May 9, 1939 |
| 2,541,446 | Trott | Feb. 13, 1951 |
| 2,553,039 | Gray | May 15, 1951 |
| 2,634,381 | Kafka | Apr. 7, 1953 |
| 2,672,574 | Evans | Mar. 16, 1954 |
| 2,707,248 | Goodrich | Apr. 26, 1955 |
| 2,718,606 | Zuerker | Sept. 20, 1955 |
| 2,743,389 | Giuffrida | Apr. 24, 1956 |
| 2,752,520 | Morrell | June 26, 1956 |

OTHER REFERENCES

Friend: "Deflection and Convergence in Color Kinescopes," IRE Proceedings, vol. 39, October 1951, pp. 1261–1263.